(12) United States Patent
Choi et al.

(10) Patent No.: US 8,795,623 B2
(45) Date of Patent: Aug. 5, 2014

(54) METHOD FOR PREPARING CERIUM CARBONATE

(75) Inventors: Sang-Soon Choi, Daejeon (KR);
Jun-Yeon Cho, Daejeon (KR);
Seung-Beom Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 277 days.

(21) Appl. No.: 13/016,311

(22) Filed: Jan. 28, 2011

(65) Prior Publication Data

US 2011/0206589 A1 Aug. 25, 2011

(30) Foreign Application Priority Data

Jan. 28, 2010 (KR) ........................ 10-2010-0008030

(51) Int. Cl.
*C01F 17/00* (2006.01)
(52) U.S. Cl.
USPC ........................................................... 423/263
(58) Field of Classification Search
USPC .................................................. 423/421, 263
See application file for complete search history.

(56) References Cited

U.S. PATENT DOCUMENTS

2007/0107318 A1* 5/2007 Oh et al. .......................... 51/307

FOREIGN PATENT DOCUMENTS

CN 1847153 A 10/2006
WO 2008/114965 A1 9/2008

OTHER PUBLICATIONS

Preparation and Properties of Monodispersed Colloidal Particles of Lanthanide Compounds I. Gadolinium, Europium, Terbium, Samarium, and Cerium(III) Egon Matijevic et al. Journal of Colloid and Interface Science, vol. 118, No. 2 (Aug. 1987) p. 506-523.*
E. Matijevic et al.: "Preparation and Properties of Monodispersed Colloidal Particles of Lanthanide Compounds", Journal of Colloid and Interface Science, 1987, vol. 118, No. 2, pp. 506-523.

* cited by examiner

*Primary Examiner* — Melvin C Mayes
*Assistant Examiner* — Douglas Call
(74) *Attorney, Agent, or Firm* — Rothwell, Figg, Ernst & Manbeck, P.C.

(57) ABSTRACT

Disclosed is a method for preparing cerium carbonate that can prepare cerium carbonate having uniform crystal structure, shape and size with high productivity. The method for preparing cerium carbonate comprises: continuously introducing a reaction solution comprising cerium precursor and urea in a tubular reactor including an inlet, an outlet, and one or more reaction tubes through the inlet; reacting the cerium precursor with urea at an elevated temperature in the reaction tube; and, continuously discharging cerium carbonate formed by the reaction of the cerium precursor and urea to the outlet.

7 Claims, 3 Drawing Sheets

METHOD FOR PREPARING CERIUM CARBONATE

BACKGROUND OF THE INVENTION (a) Field of the Invention

The present invention relates to a method for preparing cerium carbonate. More specifically, the present invention relates to a method for preparing cerium carbonate that can prepare cerium carbonate having uniform crystal structure, shape and size with high productivity.

(b) Description of the Related Art

Cerium oxide powder is a high functional ceramic material widely used as a catalyst, a phosphor, cosmetics, an abrasive, etc., and it has been recently spotlighted as an abrasive for a CMP (Chemical Mechanical Polishing) process in the field of semiconductor device.

The cerium oxide powder is commonly prepared by firing a precursor such as cerium carbonate at high temperature, and the physical properties or shape of the cerium oxide powder may be varied according to the crystal structure, shape or size (diameter) of the cerium carbonate. Therefore, to prepare cerium oxide powder having desired physical properties and shape, it is very important to uniformly obtain cerium carbonate having a controlled crystal structure, shape or size.

The cerium carbonate is generally prepared by introducing reactants such as a cerium precursor and urea in a batch type reactor of a certain size in a solution state and reacting them at an elevated temperature, and as the result, cerium carbonate in the form of powder is obtained. However, in this method, since heat transfer speed may become non-uniform at each part of the reactor if the size of the reactor exceeds a certain level, the crystal structure, shape or size of the prepared cerium carbonate powder may become non-uniform.

The reason therefor may be predicted as follows.

In the mechanism for the production of cerium carbonate powder particles, cerium carbonate that is initially produced is dissolved in a solvent until unsaturated, and the initial particles of cerium carbonate powder are formed after passing the unsaturation state. At this time, the initial particles should be rapidly and uniformly formed so that these initial particles equally grow in the solvent to prepare cerium carbonate having uniform size (diameter) and shape.

For the rapid and uniform formation of the initial particles, the decomposition speed of urea in the reaction solution is important. This is because urea is decomposed by heat to form ammonia and carbon dioxide, which react with a cerium precursor to form cerium carbonate. Specifically, if the decomposition speed of urea is slow or non-uniform, the initial particles of cerium carbonate may be non-uniformly formed and the degree of growth of each initial particle may differ, and thus, the shape or size of cerium carbonate may become non-uniform. Namely, the initial particles that are produced earlier have prolonged growth process and thus are prepared to cerium carbonate having larger diameter, while the initial particles that are produced later are prepared to cerium carbonate having small diameter, and thus, the shape or size of the finally prepared cerium carbonate may become non-uniform.

For this reason, to obtain cerium carbonate having more uniform shape and size and the like, heat transfer speed should be uniformized throughout the reactor to make the decomposition of urea uniform and rapid, however, in the existing preparation method of cerium carbonate using a batch type reactor, uniform heat transfer is difficult.

Meanwhile, it is known that the crystal structure of cerium carbonate may be varied according to reaction conditions such as reaction temperature and the like. Cerium carbonate may be divided into orthorhombic and hexagonal cerium carbonate according to the crystal structure, and it is commonly known that the orthorhombic cerium carbonate is prepared by a precipitation reaction at comparatively low temperature, and the hexagonal cerium carbonate is prepared by a high temperature high pressure reaction. However, in the existing method using a batch type reactor, since heat transfer may become non-uniform at each part of the reactor to vary reaction conditions including reaction temperature and the like, the crystal structure of the finally prepared cerium carbonate may become non-uniform if the size of the reactor exceeds a certain level.

Due to the above-explained problems, in the prior art, in case the size of the reactor was large beyond a certain level, the crystal structure, shape or size of the finally prepared cerium carbonate often became non-uniform, and thus, cerium oxide powder prepared from the cerium carbonate often had non-uniform physical properties, shape and size. Therefore, there was a limit to increase the size of the reactor, which had a bad influence on mass production of cerium carbonate.

To solve these problems, there has been an attempt to secure temperature uniformity inside the reactor by separately designing the shape or size of a stirrer, however, there is a limit to secure temperature uniformity inside the reactor simply by changing the size etc. of the stirrer as the size of the reactor increases.

SUMMARY OF THE INVENTION

Accordingly, it is an object of the present invention to provide a method for preparing cerium carbonate capable of preparing cerium carbonate having uniform crystal structure, shape and size with high productivity and cerium carbonate powder prepared thereby.

The present invention provides a method for preparing cerium carbonate comprising: continuously introducing a reaction solution comprising a cerium precursor and urea in a tubular reactor including an inlet, an outlet, and one or more reaction tubes through the inlet; reacting the cerium precursor with urea at an elevated temperature in the reaction tube; and, continuously discharging cerium carbonate formed by the reaction of the cerium precursor and urea to the outlet, wherein during the continuous introduction of the reaction solution, the reaction solution is continuously introduced at a speed enabling residence of the reaction solution in the reaction tube for a residence time satisfying the following Mathematical Formula 1:

$$\text{Residence time(min)} \geq 20000 \cdot [\{\text{concentration(mol/L)} \cdot \text{diameter(inch)}\}/\text{temperature(}^\circ\text{C.)}] \quad \text{[Mathematical Formula 1]}$$

in the Mathematical Formula 1, "residence time (min)" represents a period of time (min) during which the reaction solution resides in the reaction tube, "concentration (mol/L)" represents molar concentration of the cerium precursor in the reaction solution, "diameter (inch)" represents diameter (inch) of the reaction tube, and "temperature (° C.)" represents a temperature inside of the reaction tube when the reaction solution is introduced The present invention also provides cerium carbonate powder prepared by the above method.

DETAILED DESCRIPTION OF THE EMBODIMENTS

Figure 1:
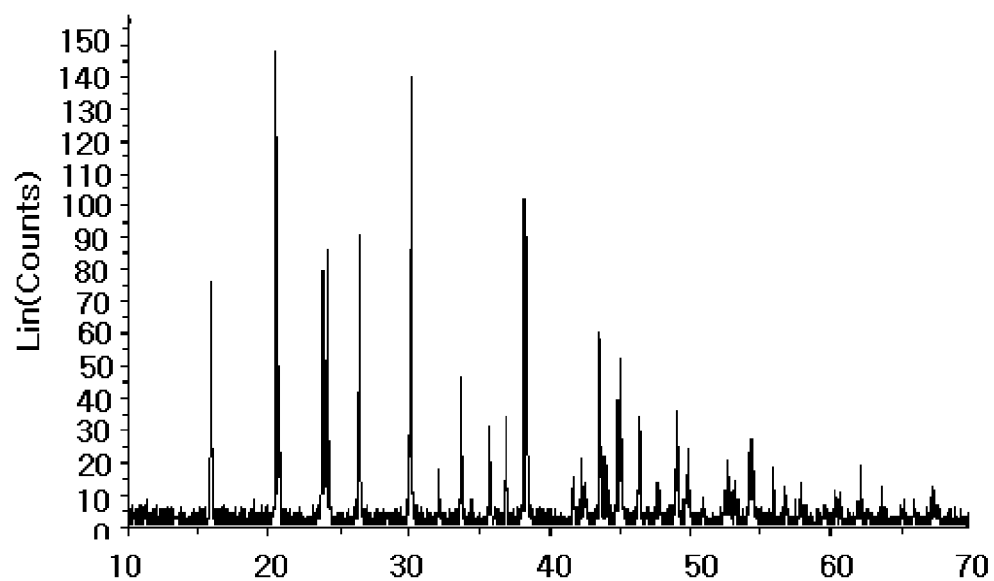
FIG. 1 shows XTD analysis results of orthorhombic cerium carbonate prepared in Examples 1 and 3.

Hereinafter, a method for preparing cerium carbonate and cerium carbonate powder according to exemplary embodiment will be explained.

According to one embodiment of the invention, provided is a method for preparing cerium carbonate comprising: continuously introducing a reaction solution comprising a cerium precursor and urea in a tubular reactor including an inlet, an outlet, and one or more reaction tubes; reacting the cerium precursor with urea at an elevated temperature in the reaction tube; and, continuously discharging cerium carbonate formed by the reaction of the cerium precursor and urea to the outlet, wherein during the continuous introduction of the reaction solution, the reaction solution is continuously introduced at a speed enabling residence of the reaction solution in the reaction tube for a residence time satisfying the following Mathematical Formula 1:

Residence time(min)≥20000·[{concentration(mol/L) ·diameter(inch)}/temperature(° C.)]   [Mathematical Formula 1]

in the Mathematical Formula 1, "residence time (min)" represents a period of time (min) during which the reaction solution resides in the reaction tube, "concentration (mol/L)" represents molar concentration of the cerium precursor in the reaction solution, "diameter (inch)" represents diameter (inch) of the reaction tube, and "temperature (° C.)" represents a temperature inside of the reaction tube when the reaction solution is introduced In this method, cerium carbonate is prepared by progressing the reaction of a cerium precursor and urea while continuously providing a reaction solution comprising the cerium precursor and urea in a tubular reactor including one or more reaction tubes having relatively thin thickness and long length instead of the existing batch type reactor. The reaction tube refers to a reaction part of a tubular shape which has a circular, oval or polygonal cross-section, and includes an inlet and an outlet that are opened or can be opened. The reaction tube has a tubular shape with long length compared to the diameter of the cross-section.

If the cerium precursor and urea is reacted in the tubular reactor having one or more reaction tubes as described above, the reaction tube of thin thickness may be wholly heated to facilitate uniformization of internal temperature of the reaction tube and uniform heat transfer to the reaction solution comprising the cerium precursor. Specifically, since the reaction tube having thin thickness does not cause time delay for heat transfer to the inside, the reaction solution continuously provided in the reaction tube may be wholly uniformly reacted at an elevated temperature, and the cerium precursor and urea in the continuously provided reaction solution may be reacted in small quantities for a short time.

Specifically, if the reaction solution is allowed to reside in the reaction tube for at least a residence time satisfying the condition of the Mathematical Formula 1 and react according to the molar concentration of the cerium precursor related to the reaction amount of the cerium precursor, diameter of the reaction tube, and internal temperature of the reaction tube related to reaction temperature and the like (for example, if the reaction solution is introduced in and passed the inlet and the reaction tube at a suitable speed so as to satisfy the residence time), uniform heat transfer suitable for efficient preparation of cerium carbonate to the reaction solution may be enabled.

Thereby, the cerium precursor and urea in the reaction solution flowing in the reaction tube may be reacted at an elevated temperature under uniform temperature condition, and thus the speed of decomposition of urea may be constantly maintained and the production of cerium carbonate initial particles may be uniformized, thereby obtaining cerium carbonate having more uniform particle diameter, shape and crystal structure by the reaction of the cerium precursor and urea.

Moreover, in case mass production of cerium carbonate is required, increase in the number of the reaction tubes included in the tubular reactor may cause reaction of the cerium precursor and the like in larger quantities to mass-produce cerium carbonate, and even if the increase in the number of the reaction tubes does not cause any difficulty in uniformization of heat transfer to each reaction tube. Furthermore, if the reaction solution is introduced in and passed the reaction tube at a high speed as possible while satisfying the condition of the Mathematical Formula 1, greater amount of the cerium precursor and the like may be reacted. Therefore, according to the preparation method of one embodiment of the invention, cerium carbonate having uniform crystal structure, shape and size may be prepared with high productivity, and cerium oxide having desired physical properties and shape may be prepared therefrom.

Hereinafter, the method for preparing cerium carbonate is explained in more detail.

In the method, a cerium precursor and urea is reacted at an elevated temperature while continuously introducing a reaction solution comprising the cerium precursor and urea in a tubular reactor having one or more reaction tubes through an inlet and passing the reaction tube.

At this time, it is important to introduce the reaction solution in the inlet and pass it through the reaction tube at a suitable speed, and thereby, the reaction solution may reside in the reaction tube for a suitable time and cause an elevated-temperature reaction under uniform heat transfer to prepare cerium carbonate having excellent and uniform physical properties. Specifically, according to diameter of the reaction tube, internal temperature of the reaction tube when the reaction solution is introduced, and concentration of the cerium precursor in the reaction solution, the reaction solution may reside in the reaction tube for a residence time satisfying the conditions of the Mathematical Formula 1 and cause an elevated-temperature reaction of the cerium precursor and urea, and thereby, cerium carbonate having uniform physical properties may be efficiently prepared.

Therefore, in the introduction of the reaction solution, introduction speed may be determined so that the reaction solution may reside in the reaction tube for a residence time satisfying the condition of the Mathematical Formula 1, and the reaction solution may be continuously introduced in the inlet at a determined introduction speed and passed through the reaction tube. At this time, the introduction speed may be easily determined by one of ordinary knowledge in the art considering the residence time and the length of the reaction tube according to the Mathematical Formula 1. And, cerium carbonate having uniform physical properties may be prepared with high productivity by decreasing the residence time and increasing the introduction speed within the range satisfying the condition of the Mathematical Formula 1.

In the preparation method according to one embodiment, the reaction tube may preferably have a diameter of about 5 inches or less, more particularly about ¼ inches to 5 inches, so that uniform heat transfer to the reaction solution and the cerium precursor and the like included therein may be enabled and the reaction solution may be flowed in the reaction tube at a suitable flow rate. More preferably, the reaction tube may have a diameter of about 1 inch or less, most preferably about ¼ inches to 1 inch, and thereby, uniform heat transfer to the reaction solution may be enabled without concern for blocking of the reaction tube by the cerium precursor, urea, or cerium carbonate particles formed by the reaction thereof.

And, the reaction tube may have a suitable length so that the cerium precursor and urea may reside in the reaction tube for an appropriate time and be reacted at an elevated temperature. For example, if the reaction solution resides for a short time that does not satisfy the Mathematical Formula 1 in the reaction tube, for example, for less than 5 minutes, yield and productivity of cerium carbonate may decrease. Therefore, the reaction tube may preferably have a length enabling continuous flowing of the reaction solution in the reaction tube and the residence and the elevated-temperature reaction for example for 5 minutes or more. The length of the reaction tube may be easily determined by one of ordinary knowledge in the art considering the speed of the reaction solution passing the reaction tube and the Mathematical Formula 1 and the like, and for example, it may have a length of about 15 cm or more, properly about 20 cm or more, preferably about 30 cm to about 5 m.

The reaction tube may be made of any material that does not react with the cerium precursor, urea or solvent. And, the tubular reactor including one or more reaction tubes as described above may include a Static Mixer well known to one of ordinary knowledge in the art. However, the elevated-temperature reaction for the preparation of cerium carbonate is not limited in the Static Mixer, and any tubular reactor equipped with a reaction tube satisfying the conditions of the above explained diameter, length and material may be used for the preparation of cerium carbonate.

Meanwhile, in the preparation method of cerium carbonate, it may be preferable that the temperature of the reaction tube is elevated prior to the introduction of the reaction solution in the inlet of the reaction tube. For example, as will be described in the Examples, after elevating the temperature of the reaction tube to about 140° C. in advance, distilled water may be passed through the reaction tube to control internal temperature of the reaction tube so as to wholly correspond to the reaction temperature, and then, the reaction solution may be introduced to progress an elevated-temperature reaction. By controlling the internal temperature of the reaction tube beforehand and then introducing the reaction solution and progressing the elevated-temperature reaction, more uniform heat transfer to the reaction solution passing the reaction tube may be enabled, thereby preparing cerium carbonate having uniform shape, size and crystal structure.

And, in the preparation method of cerium carbonate, the cerium precursor used as a reactant may include cerium nitrate, sulfate, chloride or ammonium salt and the like, and besides, various compounds comprising cerium and maintaining solid phase at room temperature (for example, at −20~40° C.) may be used as the cerium precursor without specific limitation. For example, cerium salt comprising tri-valent or tetra-valent cerium may be used as the cerium precursor. Specific examples of the cerium precursor may include cerium nitrate (Ce(NO$_3$)3.xH2O), cerium sulfate (Ce(SO4)3.xH2O or Ce(SO4)2.xH2O), cerium chloride (CeCl3.xH2O) or diammonium cerium nitrate (Ce(NH4)2(NO3)6 or Ce(NH4)2(NO3)5.xH2O) (wherein, x is a constant of 0~10).

And, urea (CO(NH2)2) reacting with the cerium precursor may function as a carbon source providing carbonate ion (CO32-) and a pH controlling agent.

And, the cerium precursor and urea may be introduced in the inlet of the reaction tube in a solution state dissolved or dispersed in a solvent. As the solvent, any aqueous or organic solvent capable of dissolving or dispersing the cerium precursor and urea may be used. The solvent may include, although not limited thereto, water, an alcohol based solvent, or a glycol based solvent, or a mixed solvent thereof. However, considering reactivity of the cerium precursor and urea or easiness of solvent removal, water or an aqueous solvent comprising the same, for example, a mixed solvent of water and alcohol or a mixed solvent of water and glycol and the like, may be used. And, the alcohol based solvent or glycol based solvent may include ethylene glycol, methanol or ethanol that can be mixed with water.

Meanwhile, after continuously introducing the reaction solution comprising the cerium precursor and urea in the inlet of the reaction tube, the reaction of the cerium precursor and urea is conducted at elevated-temperature while passing the reaction solution through the reaction tube at a constant speed. The elevated-temperature reaction may be conducted at a temperature of from 80 to 300° C. At this time, the reaction solution in the reaction tube may have uniform reaction temperature on the whole by conducting the elevated-temperature reaction in the reaction tube having thin thickness. If the temperature of the elevated-temperature reaction is too lowered, urea may not be sufficiently decomposed or the speed of decomposition may be lowered to decrease yield or productivity of cerium carbonate, and to the contrary, if the temperature of the elevated-temperature reaction excessively rises, gas pressure in the reaction tube may excessively increase.

In the preparation method of cerium carbonate, cerium carbonate having a desired crystal structure, shape or size may be uniformly obtained by controlling reaction temperature within the above explained temperature range.

Non-limiting technical principle thereof is as follows.

Cerium carbonate that can be prepared by the reaction of a cerium precursor and urea may be divided into orthorhombic cerium carbonate (Ce2O(CO3)2.H2O) or hexagonal cerium carbonate (Ce(OH).(CO3)) according to its crystal structure. The preparation reaction of cerium carbonate of each crystal structure may be summarized by the following Reaction Formula 1.

$$H_2N-Co-NH_2 \Leftrightarrow NH_4^+ + OCN^-$$

$$OCN^- + 2H^+ + H_2O \rightarrow CO_2 + NH_4^+$$

$$OCN^- + OH^- + H_2O \rightarrow NH_3 + CO_3^-$$

$$2[Ce(H_2O)_n]^{3+} + 3CO_3^{2-} \rightarrow Ce_2O(CO_3)_2.H_2O + CO_2 + (n-1)H_2O : orthorhombic$$

$$[Ce(H_2O)_n]^{3+} + H_2O \rightarrow [Ce_2(OH)(H_2O)_{n-1}]^{2+} + H_3O^+$$

$$[Ce_2(OH)(H_2O)_{n-1}]^{2+} + CO_3^{2-} \rightarrow Ce(OH)CO_3 + (n-1)H_2O : hexagonal \quad \text{[Reaction Formula 1]}$$

Referring to the Reaction Formula 1, since weak hydrolysis of cerium ion should occur before binding of carbonate ion with cerium ion for the preparation of hexagonal cerium carbonate, it may be prepared at higher temperature than orthorhombic cerium carbonate. However, if an aqueous solvent such as water is used as the solvent for the reactant, the reaction should be conducted at high temperature high pressure so as to prepare hexagonal cerium carbonate due to limitation of boiling point of the solvent.

However, according to one embodiment of the invention, since cerium carbonate is prepared in a relatively thin reaction tube while uniform heat transferring to the reaction solution, the crystal structure of cerium carbonate that may be varied according to the conditions including reaction temperature or pressure may be easily controlled. Specifically, since the whole reaction solution in the reaction tube may have equal reaction temperature or pressure, cerium carbonate, i.e., hexagonal or orthorhombic cerium carbonate having uniform crystal structure may be uniformly obtained. And, although cerium carbonate powder may partly differ in the shape or size according to the crystal structure, according to one embodiment of the invention, the prepared cerium carbonate may have uniform crystal structure by uniformizing temperature and pressure of the whole reaction solution, thereby uniformly obtaining cerium carbonate having a desired crystal structure, shape or size.

In addition, in the preparation method, since the temperature elevation and the reaction are conducted while flowing the reaction solution in a thin reaction tube, even if the elevated-temperature reaction is conducted under relatively low pressure, hexagonal cerium carbonate and the like may be efficiently prepared. Thereby, problems such as danger of a high pressure reaction or necessity of an expensive high pressure reactor and the like may be largely reduced, and cerium carbonate, specifically hexagonal cerium carbonate may be efficiently prepared with high productivity.

Meanwhile, in the temperature-elevated reaction of the cerium precursor and urea, the concentration of the cerium precursor in the reaction solution may be about 0.05 to 3 mol/L, preferably about 0.1 to 3 mol/L. If the concentration of the cerium precursor is too low, the hourly production of cerium carbonate may be small to decrease productivity even if the flow rate of the reaction solution increases. To the contrary, if the concentration of the cerium precursor is too high, the production of cerium carbonate may be too large to cause blocking of the reaction tube.

And, the mole ratio of the cerium precursor and urea in the reaction solution may be about 1:0.1 to 1:20, preferably about 1:1 to 1:3. If the equivalent ratio of urea to the cerium precursor is too low, unreacted cerium precursor may increase to decrease yield of cerium carbonate, and to the contrary, if the equivalent ratio of urea is too high, washing may be difficult due to unreacted urea after the elevated-temperature reaction and economic feasibility of the whole preparation process may decrease.

And, the elevated-temperature reaction of the cerium precursor and urea may be conducted for about 5 minutes to 60 hours, preferably about 10 minutes to 40 hours, more preferably about 10 minutes to 30 hours. The reaction time may correspond to the residence time of the reaction solution in the reaction tube, which should satisfy the relationship of the above explained Mathematical Formula 1. The reaction time may be controlled by appropriately setting the introduction speed of the reaction solution or the length of the reaction tube and the like, as shown in the Mathematical Formula 1. And, cerium carbonate having a desired crystal structure, shape and size may be uniformly obtained by controlling the reaction time. Specifically, orthorhombic cerium carbonate or hexagonal cerium carbonate may be selectively obtained by controlling the reaction time together with reaction temperature, and cerium carbonate having a desired crystal structure, shape and size may be uniformly obtained by controlling heat transfer to the reaction solution and particle growth of cerium carbonate powder uniformly.

And, the elevated-temperature reaction may be conducted while maintaining the pressure in the reaction tube about 1 to 100 bar, preferably about 1 to 50 bar, more preferably about 1 to 5 bar. In the preparation method, since the elevated-temperature reaction of the cerium precursor and urea occurs while the reaction solution flows in the thin reaction tube, the temperature of the reaction solution may be wholly uniformly elevated to react urea even if the reaction pressure is not so high, and furthermore, a high temperature reaction may be easily caused to efficiently prepare hexagonal cerium carbonate. However, in case a high pressure reaction is required due to necessity of higher reaction temperature, the elevated-temperature reaction may be progressed while maintaining internal pressure of the reaction tube high by adding pressure at one side of the reaction tube using a commercially available back pressure regulator and the like.

And, the elevated-temperature reaction may be progressed while appropriately maintaining the pH of the reaction solution within the range of 0-7, and acid such as nitric acid and the like may be further added to the reaction solution to control the pH.

Meanwhile, after reacting the cerium precursor with urea at an elevated temperature under the above explained conditions to obtain cerium carbonate, the cerium carbonate may be continuously discharged to the outlet of the reaction tube to recover cerium carbonate. The obtained cerium carbonate may be dried and/or washed and collected in the form of powder according to a common process. Since the cerium carbonate may exhibit uniform crystal structure, shape and size because it has been prepared under uniform reaction temperature, cerium oxide having desired physical properties and shape may be easily obtained from the cerium carbonate, and the cerium oxide may be preferably used as an abrasive for Chemical Mechanical Polishing (CMP) slurry and the like.

Thus, according to another embodiment of the invention, provided is cerium carbonate powder prepared by the above explained preparation method. The cerium carbonate powder may comprise cerium carbonate of orthorhombic or hexagonal crystal structure in an appropriate ratio, and it may comprise one of them in the content of 50 vol % or more.

And, since the cerium carbonate powder may have uniform particle diameter and shape, cerium oxide having desired physical properties and shape may be easily obtained from the cerium carbonate. For example, cerium oxide powder having physical properties and shape for an abrasive for CMP slurry may be easily obtained from the cerium carbonate powder prepared by the above method.

As explained, according to the present invention, cerium carbonate having more uniform crystal structure, shape and size may be prepared with high productivity. Therefore, cerium oxide powder having desired physical properties and shape may be uniformly obtained from the cerium carbonate, and the cerium oxide powder may be preferably used as an abrasive for CMP slurry and the like.

The present invention is further explained in more detail with reference to the following examples. These examples, however, should not be interpreted as limiting the scope of the present invention in any manner.

Preparation of Cerium Carbonate

Example 1

After dissolving 0.1 mol of cerium nitrate in 1000 mL of distilled water at room temperature, nitric acid was added to the dissolved cerium salt to titrate to pH of 2. And, 0.3 mol of urea was dissolved in 1000 mL of distilled water at room temperature in another container, and then, the two solutions were mixed and stored at an elevated temperature of 60° C. Distilled water was introduced in a Static mixer preheated to 250° C. using a high pressure pump to maintain the temperature of the Static mixer 100° C. At this time, the Static mixer includes 4 reaction tubes each having diameter of ¼ inches and length of 30 cm.

Meanwhile, when the temperature of the Static mixer reaches a reaction temperature of 100° C., the raw material solution of which temperature was elevated to 60° C. was introduced and reaction was progressed. The solution of raw material was passed through the reaction tube at a flow rate of 10 ml/mm so that the residence time in the reaction tube may be 10 minutes or more, and the reaction was completed when the solution was discharged from the reaction tube and passed a cooling zone.

Figure 4:
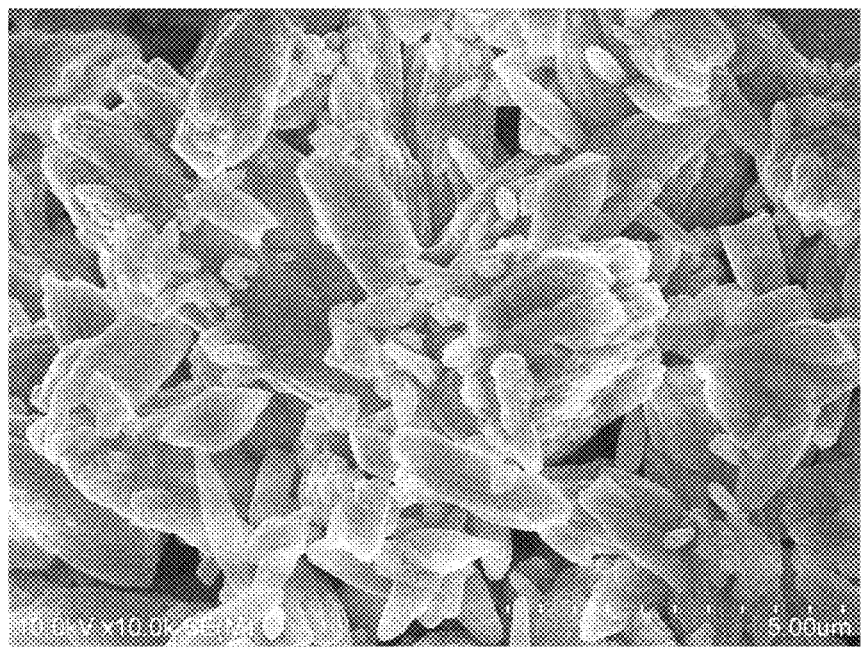
FIG. 4 is an electron microscope image of cerium carbonate prepared in Example 1.

The crystal structure of the obtained product (cerium carbonate) was confirmed by XRD analysis, and the XRD pattern is shown in FIG. 1. And, the product cerium carbonate is confirmed by electron microscope and the image is shown in FIG. 4. Referring to FIGS. 1 and 4, it is confirmed that cerium carbonate obtained by the reaction in a Static mixer has a uniform orthorhombic crystal structure because it was prepared under uniform temperature (see FIG. 1), and it has uniform shape and size (diameter). (see FIG. 4)

Example 2

After dissolving 0.3 mol of cerium nitrate in 1000 mL of distilled water at room temperature, nitric acid was added to the dissolved cerium salt to titrate to pH of 2. And, 0.9 mol of urea was dissolved in 1000 mL of distilled water at room temperature in a separate container, and then, the two solutions were mixed and maintained at an elevated temperature of 60° C. Distilled water was introduced in a Static mixer preheated to 250° C. using a high pressure pump to maintain the temperature of the Static mixer 140° C. At this time, the Static mixer included 4 reaction tubes having diameter of ¼ inches and length of 30 cm.

Meanwhile, when the temperature of the Static mixer reaches a reaction temperature of 140° C., the raw material solution of which temperature was elevated to 60° C. was introduced to progress the reaction. At this time, the solution of raw material was passed through the reaction tube at a flow rate of 10 ml/mm so that the residence time in the reaction tube may become 13 minutes or more, and the reaction was completed when the solution was discharged from the reaction tube and passed a cooling zone.

Figure 2:
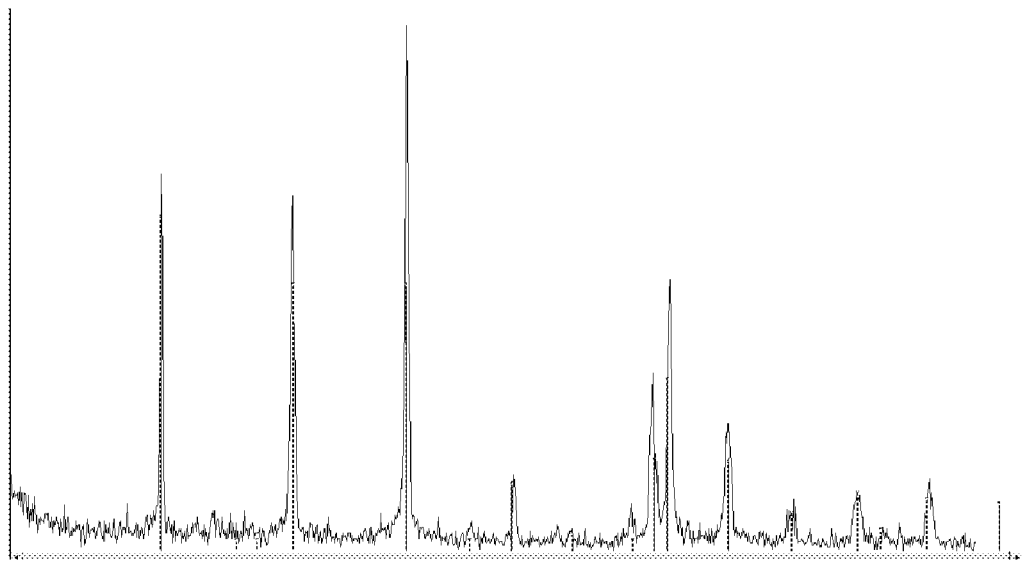
FIG. 2 show XRD analysis results of hexagonal cerium carbonate prepared in Examples 2 and 4.
Figure 3:
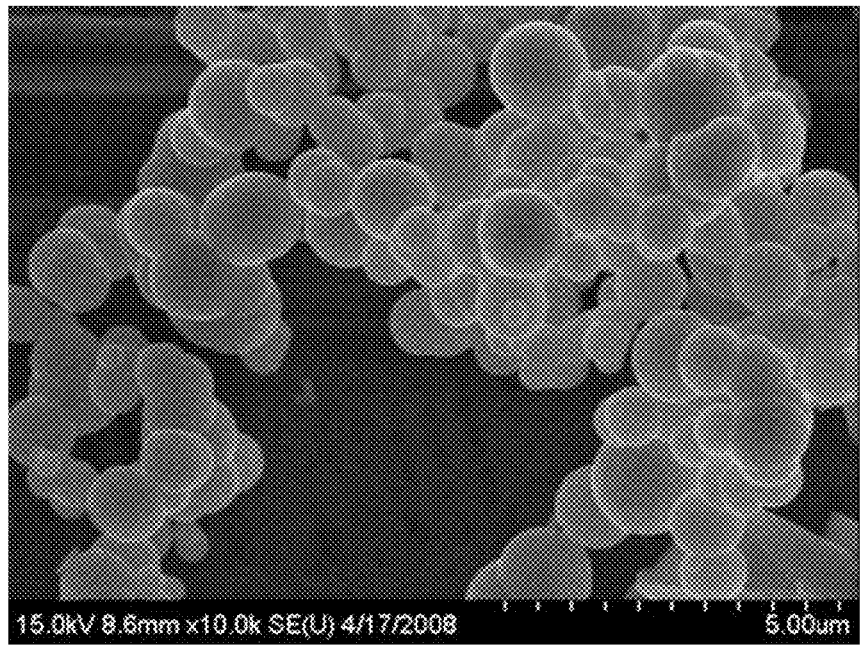
FIG. 3 is an electron microscope image of cerium carbonate prepared in Examples 2 and 4.

The crystal structure of the obtained product (cerium carbonate) was confirmed by XRD analysis, and the XRD pattern is shown in FIG. 2. And, the product cerium carbonate was confirmed by electron microscope, and the image is shown in FIG. 3. Referring to FIGS. 2 and 3, it is confirmed that cerium carbonate obtained by the reaction in the Static mixer has an hexagonal crystal structure because it was prepared at comparatively high temperature, and specifically, it is confirmed that it has a uniform crystal structure on the whole (FIG. 2) because it was prepared under uniform temperature, and has uniform shape and size (diameter) (FIG. 3).

Example 3

After dissolving 0.3 mol of cerium nitrate in 1000 mL of distilled water at room temperature, nitric acid was added to the dissolved cerium salt to titrate to pH of 3. And, 0.3 mol of urea was dissolved in 1000 mL of distilled water at room temperature in a separate container, and then, the two solutions were mixed and maintained at an elevated temperature of 60° C. Distilled water was introduced in a Static mixer preheated to 250° C. using a high pressure pump to maintain the temperature of the Static mixer 100° C. The Static mixer included 4 reaction tubes having diameter of ¼ inches and length of 30 cm.

Meanwhile, when the temperature of the Static mixer reaches a reaction temperature of 100° C., the raw material solution of which temperature was elevated to 60° C. was introduced to progress the reaction. At this time, the solution of raw material was passed through the reaction tube at a flow rate of 10 ml/mm so that the residence time in the reaction tube may become 15 minutes or more, and the reaction was completed when the solution was discharged from the reaction tube and passed a cooling zone.

Figure 5:
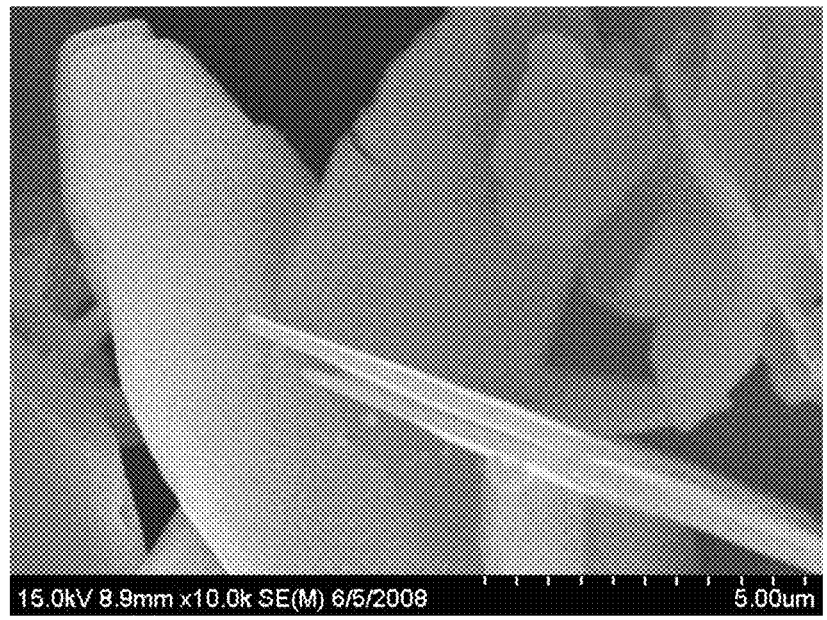
FIGS. 5 and 6 are electron microscope images of cerium carbonate prepared in Example 3.
Figure 6:
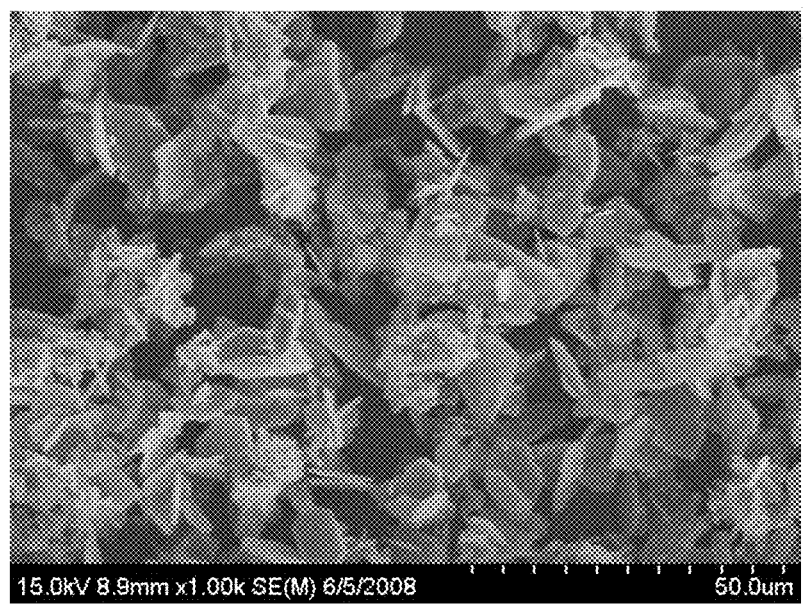

The crystal structure of the obtained product (cerium carbonate) was confirmed by XRD analysis, and the XRD pattern is shown in FIG. 1. And, the product cerium carbonate was confirmed by electron microscope, and the image is shown in FIGS. 5 and 6. Referring to FIGS. 1, 5 and 6, it is confirmed that cerium carbonate obtained by the reaction in the Static mixer has a uniform orthorhombic crystal structure because it was prepared under uniform temperature (FIG. 1), and has uniform shape and size (diameter) (FIGS. 5 and 6). In addition, since the cerium carbonate of Example 3 was prepared under partly different reaction conditions from Example 1, it is confirmed that it has partly different size and the like from the cerium carbonate of Example 1, suggesting that the shape and size of cerium carbonate may be controlled by reaction conditions.

Example 4

After dissolving 0.1 mol of cerium nitrate in 1000 mL of distilled water at room temperature, nitric acid was added to the dissolved cerium salt to titrate to pH of 2. And, 0.3 mol of urea was dissolved in 1000 mL of distilled water at room temperature in a separate container, and then, the two solutions were mixed and maintained at an elevated temperature of 60° C. Distilled water was introduced in a Static mixer preheated to 250° C. using a high pressure pump to maintain the temperature of the Static mixer 140° C. The Static mixer included 4 reaction tubes having diameter of ¼ inches and length of 30 cm.

Meanwhile, when the temperature of the Static mixer reaches a reaction temperature of 140° C., the raw material solution of which temperature was elevated to 60° C. was introduced to progress the reaction. At this time, the pressure in the reaction tube was maintained 5 bar, the solution of raw material was passed through the reaction tube at a flow rate of 10 ml/mm so that the residence time in the reaction tube may become 10 minutes or more, and the reaction was completed when the solution was discharged from the reaction tube and passed a cooling zone.

The crystal structure of the obtained product (cerium carbonate) was confirmed by XRD analysis, and the XRD pattern is shown in FIG. 2. And, the product cerium carbonate was confirmed by electron microscope, and the image is shown in FIG. 3. Referring to FIGS. 2 and 3, it is confirmed that cerium carbonate obtained by the reaction in the Static mixer has an hexagonal crystal structure because it was prepared at comparatively high temperature, and specifically, it is confirmed that it has a uniform crystal structure on the whole because it was prepared under uniform temperature (FIG. 2), and has uniform shape and size (diameter) (FIG. 3)

It was confirmed whether or not the Examples 1 to 4 satisfy the relationship of the Mathematical Formula 1, and the results are summarized in the following Table 1.

TABLE 1

|  | Reaction time (residence time in reaction tube; min) | Concentration of cerium carbonate (mol/L) | Diameter of reaction tube (inch) | Reaction temperature (temperature in reaction tube; °C) | Right side of Mathematical Formula 1 | Satisfiability of Mathematical Formula 1 |
|---|---|---|---|---|---|---|
| Example 1 | 10 minutes or more | 0.1 | 0.25 | 100 | 5 | Satisfying |
| Example 2 | 13 minutes or more | 0.3 | 0.25 | 140 | 10.71 | Satisfying |
| Example 3 | 15 minutes or more | 0.3 | 0.25 | 100 | 15 | Satisfying |
| Example 4 | 10 minutes or more | 0.1 | 0.25 | 140 | 3.57 | Satisfying |

From the Examples 1 to 4 and Table 1, it is confirmed that in case a reaction is conducted at an elevated temperature in a tubular reactor while continuously introducing a reaction solution comprising a cerium precursor and urea under conditions satisfying the relationship of the Mathematical Formula 1, uniform heat transfer to the cerium precursor and urea and an elevated-temperature reaction occur to prepare cerium carbonate powder having excellent physical properties of uniform shape and size.

Accordingly, it is confirmed that cerium carbonate powder may be prepared with high productivity by preparing cerium carbonate by continuous reaction in the tubular reactor.

What is claimed is:

1. A method for preparing cerium carbonate comprising:
continuously introducing a reaction solution comprising a cerium precursor and urea in a tubular reactor including an inlet, an outlet, and one or more reaction tubes through the inlet; reacting the cerium precursor with urea at an elevated temperature in the reaction tube; and continuously discharging cerium carbonate formed by the reaction of the cerium precursor and urea to the outlet,
wherein during the continuous introduction of the reaction solution, the reaction solution is continuously introduced at a speed enabling residence of the reaction solution in the reaction tube for a residence time satisfying the following Mathematical Formula 1,
wherein the residence time of the reaction solution in the reaction tube is 5 to 15 minutes, the concentration of the cerium precursor in the solution is 0.1 to 3 mol/L, and the reaction tube has a diameter of 0.25 to 5 inches:

$$\text{Residence time(min)} \geq 20000 \cdot [\{\text{concentration(mol/L)} \cdot \text{diameter(inch)}\}/\text{temperature(°C)}] \quad \text{[Mathematical Formula 1]}$$

in the Mathematical Formula 1, "residence time (min)" represents a period of time (min) during which the reaction solution resides in the reaction tube, "concentration (mol/L)" represents molar concentration of the cerium precursor in the reaction solution, "diameter (inch)" represents diameter (inch) of the reaction tube, and "temperature (°C.)" represents an internal temperature of the reaction tube when the reaction solution is introduced.

2. A method for preparing cerium carbonate according to claim 1, wherein the reaction of the cerium precursor and urea is conducted at a temperature of from 80 to 300° C.

3. A method for preparing cerium carbonate according to claim 1, wherein the tubular reactor is a Static Mixer.

4. A method for preparing cerium carbonate according to claim 1, further comprising elevating the temperature of the reaction tube before the introduction of the reaction solution.

5. A method for preparing cerium carbonate according to claim 1, wherein the cerium precursor includes cerium nitrate, sulfate, chloride or ammonium salt.

6. A method for preparing cerium carbonate according to claim 1, wherein the mole ratio of the cerium precursor and urea is 1:0.1 to 1:20.

7. A method for preparing cerium carbonate according to claim 1, wherein the cerium precursor is reacted with urea while maintaining pressure in the reaction tube 1 to 100 bar.

* * * * *